US010657142B2

(12) United States Patent
Lu et al.

(10) Patent No.: US 10,657,142 B2
(45) Date of Patent: May 19, 2020

(54) COMPUTER INPUT CORRECTION USING SPACE AND TIME PROCESSES

(71) Applicant: SAP SE, Walldorf (DE)

(72) Inventors: Ke Lu, Shanghai (CN); Jianzhong Li, Shanghai (CN); Yonggao Pan, Shanghai (CN); Shangtong Zhang, Shanghai (CN); Liangyi Zhang, Shanghai (CN); Jing Zhao, Shanghai (CN)

(73) Assignee: SAP SE, Walldorf (DE)

( * ) Notice: Subject to any disclaimer, the term of this patent is extended or adjusted under 35 U.S.C. 154(b) by 621 days.

(21) Appl. No.: 15/373,350

(22) Filed: Dec. 8, 2016

(65) Prior Publication Data
US 2018/0165287 A1   Jun. 14, 2018

(51) Int. Cl.
*G06F 16/2457*   (2019.01)
*G06F 16/2452*   (2019.01)
*G06F 16/25*   (2019.01)
*G06F 9/451*   (2018.01)
*G06F 17/27*   (2006.01)
*G06F 17/21*   (2006.01)

(52) U.S. Cl.
CPC .... *G06F 16/24578* (2019.01); *G06F 16/2452* (2019.01); *G06F 16/258* (2019.01); *G06F 17/211* (2013.01); *G06F 17/276* (2013.01); *G06F 9/454* (2018.02)

(58) Field of Classification Search
CPC ............ G06F 16/24578; G06F 16/258; G06F 16/3322; G06F 16/3325; G06F 16/90324; G06F 16/24575; G06F 16/3344; G06F 16/9535; G06F 16/9537; G06F 17/243; G06F 17/211; G06F 17/276; G06F 17/27; G06F 16/2452; G06F 9/454
USPC ........................................ 707/724, 748, 756
See application file for complete search history.

(56) References Cited

U.S. PATENT DOCUMENTS

| 6,252,589 | B1* | 6/2001 | Rettig | G06F 9/454 |
| | | | | 715/703 |
| 6,717,588 | B1* | 4/2004 | Miller | G06F 9/454 |
| | | | | 715/700 |
| 7,707,496 | B1* | 4/2010 | Moore | G06F 17/2264 |
| | | | | 715/254 |
| 8,311,805 | B2* | 11/2012 | Parikh | G06F 3/0237 |
| | | | | 704/1 |
| 2003/0188260 | A1* | 10/2003 | Jensen | G06F 17/243 |
| | | | | 715/222 |

(Continued)

*Primary Examiner* — Dennis Truong
(74) *Attorney, Agent, or Firm* — Fountainhead Law Group P.C.

(57) ABSTRACT

In one embodiment, a method monitors input by a user using an application and detects a first input for a date in the application. A list of candidates is generated for the first input, the list of candidates listing the date in different formats that are possible based on the date. The method uses a space function to retrieve context for the first input, the context selected from information proximate to the first input within a threshold. Also, the method uses a time function to retrieve a history of selections, the history of selections being selected from one or more prior lists of candidates from prior inputs. The list of candidates is ranked based on a ranking function that uses the context and the history of selections to rank the list of candidates. A portion of the ranked list is output on the application for selection by the user.

20 Claims, 6 Drawing Sheets

(56) References Cited

U.S. PATENT DOCUMENTS

| | | | |
|---|---|---|---|
| 2004/0030554 A1* | 2/2004 | Boxberger-Oberoi | G10L 13/027 704/260 |
| 2009/0018859 A1* | 1/2009 | Purifoy | G06Q 10/10 705/305 |
| 2009/0019313 A1* | 1/2009 | Pokala | G06F 9/451 714/37 |
| 2011/0307478 A1* | 12/2011 | Pinckney | G06Q 30/02 707/724 |
| 2013/0166530 A1* | 6/2013 | Pilat | G06F 16/34 707/708 |
| 2013/0346065 A1* | 12/2013 | Davidson | G06F 17/273 704/8 |
| 2014/0223310 A1* | 8/2014 | Divay | G10L 15/22 715/727 |
| 2014/0244795 A1* | 8/2014 | Hoffmann | G06F 17/27 709/219 |
| 2014/0343921 A1* | 11/2014 | Fink | G06F 17/27 704/9 |
| 2015/0193548 A1* | 7/2015 | Nice | G06F 16/24575 707/748 |
| 2016/0063006 A1* | 3/2016 | Belogolov | G06F 16/3322 707/767 |

* cited by examiner

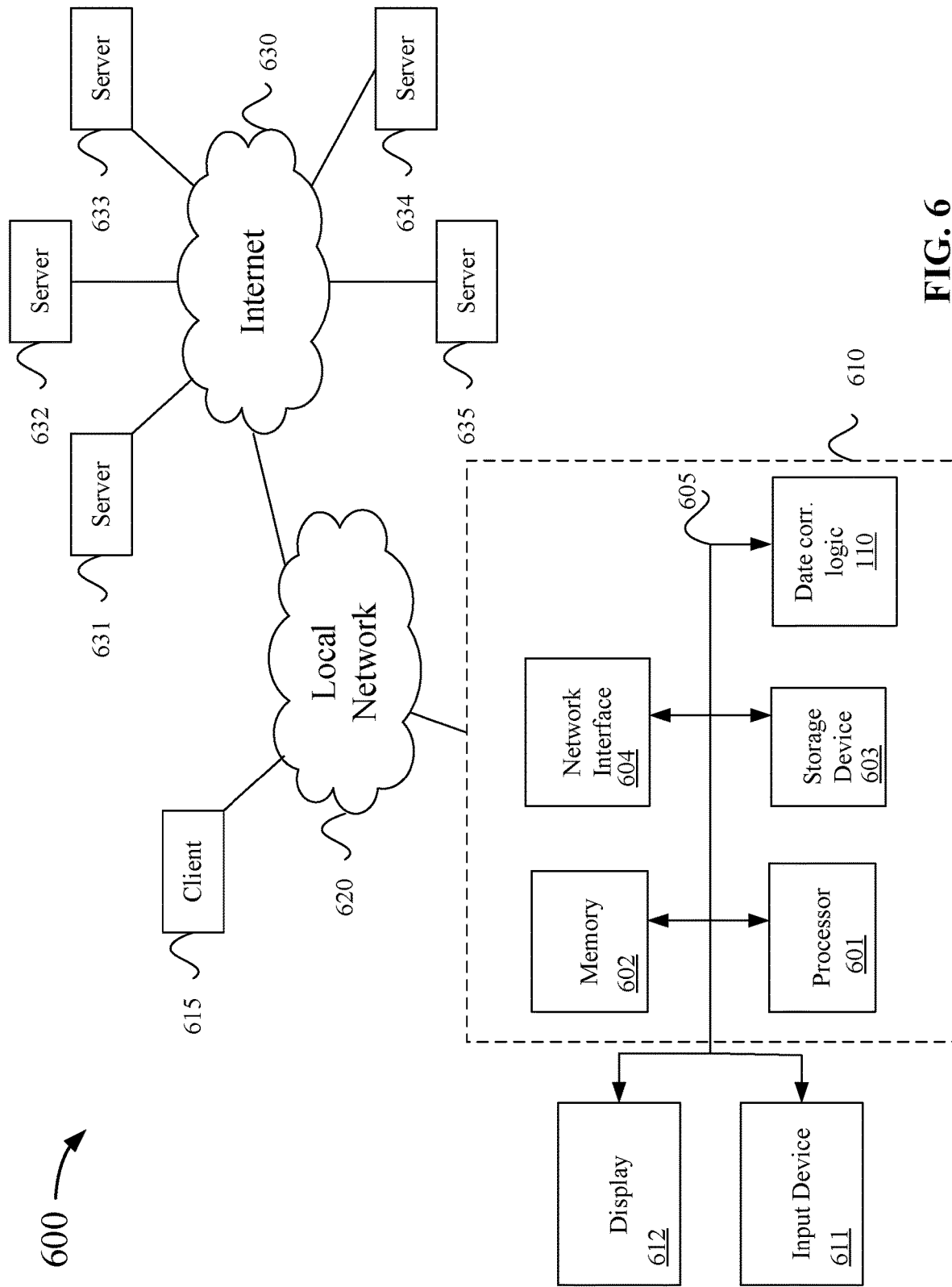

COMPUTER INPUT CORRECTION USING SPACE AND TIME PROCESSES

BACKGROUND

In applications, such as web applications, a user often needs to input a date. Different users may input the date in different formats. For example, different geographical locations may use different date formats for the date, such as users in Europe may input a date in a format differently from users in the United States. When this occurs, it is possible an application may interpret or store the wrong date.

BRIEF DESCRIPTION OF THE DRAWINGS

FIG. 6 illustrates hardware of a special purpose computing machine configured with the date correction logic according to one embodiment.

DETAILED DESCRIPTION

Described herein are techniques for a date correction system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments monitor input by a user using an application. For example, particular embodiments may monitor a user's keystrokes when using the application. Then, a first input for a date is detected in the application. For example, a user may enter a date in an entry box in the application. Then, particular embodiments generate a list of candidates for the date that are in different date formats. For example, the list of candidates may list the date in different possible formats based on what candidates are possible for the date. In one example, it may not be clear as to what date the user intended when the user enters a date of "301211". For example, the input may have the options of "December 11, 2030" or "December 30 2011. Particular embodiments can verify the date the user intended using date correction logic.

In one example, particular embodiments then use a space function to retrieve a context associated with the first input by the user. The context may be determined based on information in relation to where the first input was received, such as information on the same page as an entry box in which the date was input or within a certain amount of time or pages from the first input. Also, particular embodiments use a time function to retrieve a history of selections the user has made when presented with candidates in different date formats. For example, the user may have been given a list of candidates for other inputs and selected one date format before.

The list of candidates is then ranked based on the results of the space function and the time function. For example, the context and also the previous selections by the user are used to rank the list of candidates. Then, at least a portion of the ranked list of candidates is output on the application for selection by the user. The selection by the user is used to verify and/or correct the date format for the input.

Figure 1:
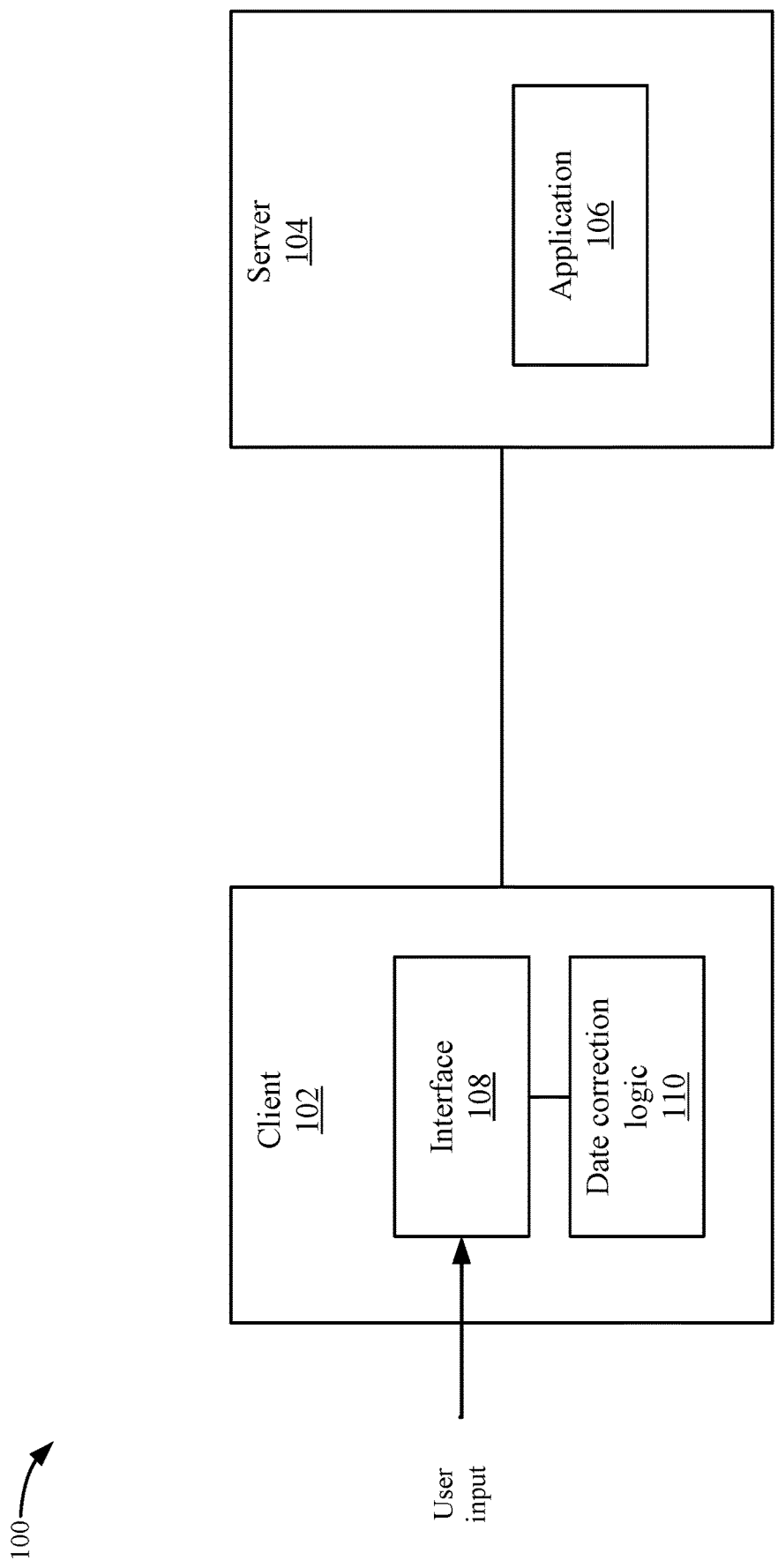
FIG. 1 depicts a simplified system for verifying and correcting a date input according to one embodiment.

FIG. 1 depicts a simplified system 100 for verifying and correcting a date input according to one embodiment. System 100 includes a client 102 and a server 104. In one embodiment, an application 106 may execute on server 104. Pages of application 106 may be displayed on a graphical user interface (GUI) 108 displayed on client 102. For example, client 102 may execute a web application. In one embodiment, because application 106 is a web application, the application may be concurrently used by many users in different locations. This may cause different date formats to be used by users of the application. This may be different from a native application that is used in only one location. In other embodiments, application 106 may be executing on client 102.

Client 102 may receive input from a user. The input may include various keystrokes that a user inputs for the application. Some of the input may include a date, such as the date may represent a month, day, and/or year. It is noted that the date may include different combinations of the month, day, and year, such as a month and year, a month, day and year; a month and day, etc. The input may be received in an entry box being displayed in a page of application 106. In other examples, the date may be received whenever the user is providing input or typing using client 102. For example, the user may be using any application on client 102.

Date correction logic 110 may detect the input from the user. For example, date correction logic 110 may be embedded in software code of application 106 and configured to detect the input in application 106. Also, date correction logic 110 may be running at the operating system level and able to detect the input no matter what application the user is using. In one embodiment, date correction logic 110 is running on the client side at client 102 and detects the input at client 102. However, in other embodiments, date correction logic 110 is running on the server side at server 104 and client 102 forwards the input to server 104.

When date correction logic 110 detects that the input may include a date, date correction logic 110 may analyze the input to determine if there are different date candidates for the input. For example, some dates that are entered may be ambiguous and cannot be determined, such as "301211". Once a date is detected, date correction logic 110 can generate a list of possible date candidates for the date. The candidates may be in different date formats that are possible for the input. Then, date correction logic 110 may use a space function and/or a time function to rank the list of date candidates. The space function determines a context for the input based on a proximity to a position from which the input was received. For example, date correction logic 110 may determine a context from a same page or number of pages proximate to where the input was received. In one embodiment, a threshold may be used, such as one page, two pages, etc. Also, the context may be determined based on other inputs the user provided on the same page, or the content of the page. One context may include the language of the page, which may provide a context as to which date format should be used. For example, if the language is French, then a date format commonly used in France may be determined to be more probable.

Date correction logic 110 may also use a time function that retrieves a history of selections from a list of candidates. For example, the selection may be only selections from the current user, or may be selections from other users, such as a user's colleagues in the same company. Date correction logic 110 uses the history of selections to determine that the user has selected a candidate with a date format before and this date format may be preferred.

Once the time function and space function are executed, date correction logic 110 may rank the list of candidates based on a ranking function. The ranking function may use the context and history from the space function and time function, respectively, to perform the ranking. Once the list of candidates has been ranked, date correction logic 110 may output at least a portion of the ranked list of candidates for application 106. For example, interface 108 may display at least a portion of the list of candidates in a selection box where the user provided the input. Interface 108 may then receive a selection from the user of the preferred date format. This verifies what date the user meant for the input.

Figure 2:
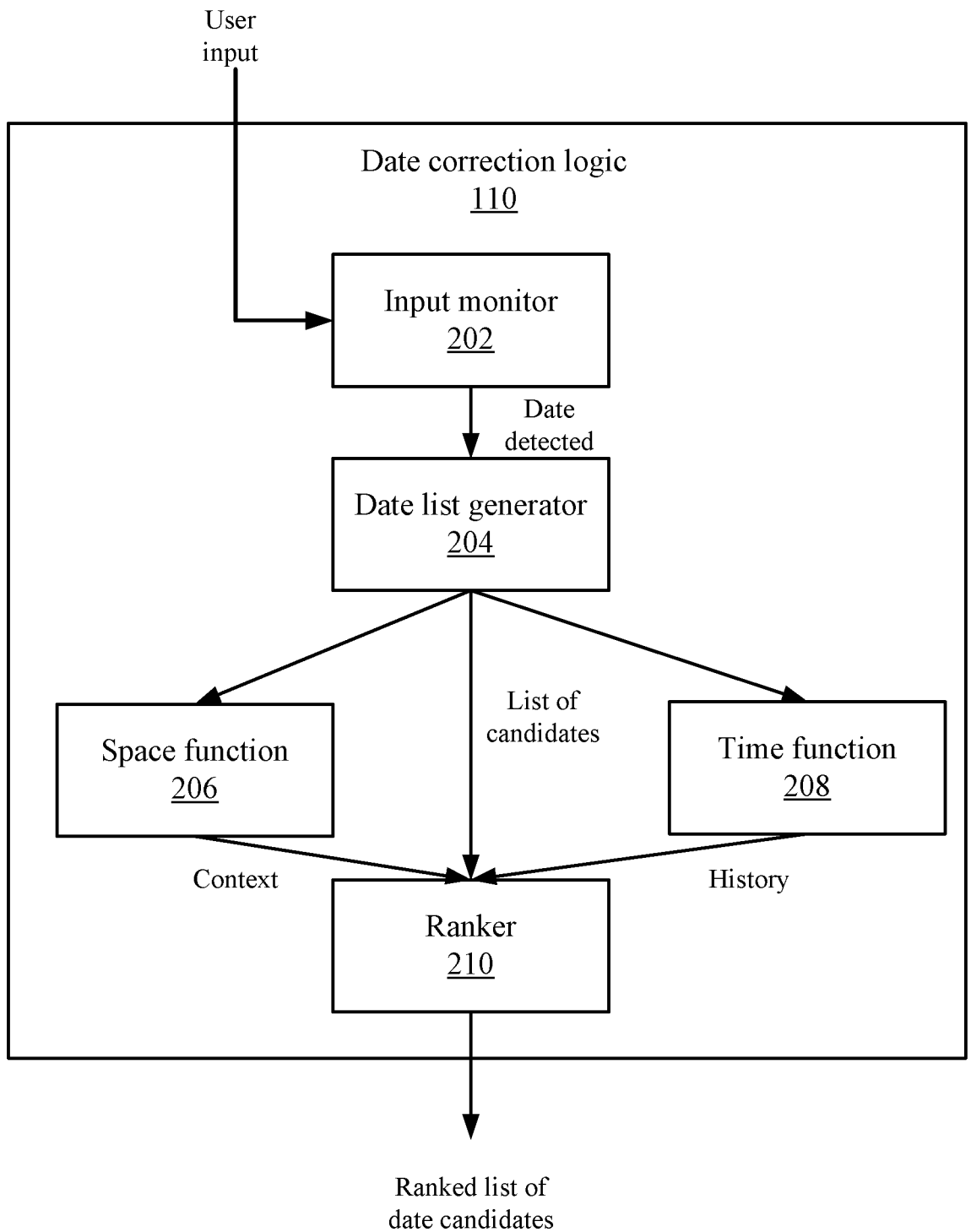
FIG. 2 depicts a more detailed example of date correction logic according to one embodiment.

FIG. 2 depicts a more detailed example of date correction logic 110 according to one embodiment. An input monitor 202 receives input from a user using application 106. Input monitor 202 may then determine when a date has been entered. In one embodiment, input monitor 202 may use pattern recognition to detect when a date has been entered. For example, the pattern recognition may detect certain formats in which a date could be entered. In other embodiments, input monitor 202 may determine certain entry boxes in which dates are always entered or required. For example, an entry box may be designated as where an input of a date will be received.

A date candidate list generator 204 receives the input from input monitor 202 and generates a list of candidates for the date. In one embodiment, date candidate list generator 204 may generate all the possible dates based on the user input. In one example, there may be only one possibility. For example, for the date "981230", there may be only one legal date of "December 30, 1998". However, for the date "2012-01-10", there may be multiple options, such as "Jan. 10, 2012" or "Oct. 1, 2012". In one embodiment, date candidate list generator 204 generates all possible candidates without removing any of the candidates.

In one example, the list of candidates is provided to a user to verify what date the user intended. In this case, the format for the candidate may be the Month, Day, and Year, with the month spelled out (e.g., January or Jan.) and all the digits of the year (e.g., 2016). By spelling out the month and providing all digits of the year, there can be no ambiguity for the date. This allows date correction logic 110 to verify the date. In other embodiments, multiple different combinations of possible date formats may be output. The date formats may include components of a combination of a month, day, and year (D), (M), (Y). The order of the basic components may include a big-Endian format, a little-Endian format, and a middle-Endian format. The big-Endian format includes the components in the sequence of year, month, day; the little-Endian format is day, month, year; and the middle-Endian format is month, day, year. Additionally, the basic components may also have different formats, such as a two-digit year (yy, e.g., 96), a four-digit year (yyyy, e.g., 1996), a one digit month for months below ten (M, e.g., 4 for April); a two-digit month (MM, e.g., 04), a three letter abbreviation for month (MMM, e.g., Dec.); the month spelled out in full (e.g., April), a one digit day for days below ten (D, e.g., 2), and a two-digit day (DD, e.g., 02). Additionally, the date format may include different separators between the components, such as slashes (e.g., "/"), dots or full stops (e.g., "."), hyphens or dashes (e.g., "-"), or spaces (e.g., " "). Any number of the different formats may be output possibly in combination with the full format of the date spelled out such as "Oct. 01, 2012—10-01-2012". This would allow the user to select a date format that is preferred and also verify the date.

Date correction logic 110 may then use a space function 206 and a time function 208. Although space function 206 and time function 208 are described, date correction logic 110 may use only one of space function 206 and time function 208, or neither. For example, date correction logic 110 may determine that one of space function 206 and time function 208 may not be applicable to this input.

Space function 206 determines a context for the input. In one embodiment, the context is determined using inputs that have been received within a threshold of the current input. For example, the threshold may include the same page, a certain time limit, a number of previous pages, or other thresholds. In another embodiment, information other than inputs may be used to determine the context, such as the language of text on the page, geolocation information, or other information that can be detected by date correction logic 110 given the access it has on client 102. Space function 206 may then output the context that is determined.

Time function 208 may search a history of selections from a user from a list of candidates. For example, the history may be selections that have been received from a user or different users selecting a date from a list of candidates. The selections used may be within a threshold, such as a time threshold, such as within the last hour, day, week, etc. Also, the threshold may also be within the last number of pages viewed or selections from the user of the application. Time function 208 may retrieve the selections, which may be a list of different date formats that were selected for different inputs. For example, for the input "2012-01-10", time function 208 could determine that the user selected "Jan. 10, 2012". Or, time function 208 can determine that the date format previously selected by the user is "YYYY-MM-DD". This provides information as to what format the user might prefer.

A ranker 210 receives information from date candidate list generator 204, space function 206, and time function 208. For example, ranker 210 receives the list of candidates, the context, and the previous selections.

Ranker 210 can then rank the list of candidates based on a ranking algorithm. The ranking algorithm may perform the ranking based on the context from the space function and the previous selections from the time function. Ranker 210 can generate scores for the list of candidates where the higher the score, the higher the rank for a candidate. Ranker 210 may use a rules-based process or machine learning process to generate scores for the candidates based on the context. In one embodiment, ranker 210 uses rules to calculate the score of each candidate. The factors include the user's previous selection, user's location and language settings, and the generalizability of the format (for example, MM-DD-YYYY is used more generally than DD-MM-YYYY, so this format has a higher score). For example, a candidate may start with a baseline score. Then, depending on the application of rules to the context and the previous selections, the score may be increased or decreased. Also, candidate, context, and previous selections may be input into a machine learning process and based on the format of the candidate, the machine learning process outputs a score for the candidate.

For example, the context affects some of scores for the date formats. If a current language can be determined by the context, then a date format that is typically used for that language includes a higher score and may be ranked higher. The ranking algorithm can apply a rule to the language context to generate the score. The rule may be if the language is determined, then a certain date format receives X score. Also, the ranking algorithm can input the candidates and context into a machine learning process to generate the score. The machine learning process would be trained to score dates for a certain language as the context higher if in the right format.

For the previous selections, ranker 210 scores the candidates based on the date formats previously selected. For example, if a user has selected the date format of year/day/month (e.g., Dec. 11, 2010) for the input of "101112", then the date format of "YYDDMM" may have a higher score and be ranked higher even if it is not the normal choice. That is, the user has input the year first in a previous date followed by the day and then the month. The ranking algorithm can apply a rule to the previous inputs to generate the score for a candidate. The rule could generate higher scores for candidates in a date format previous used. Also, the ranking algorithm can input the candidate and previous selections into a machine learning process to generate the score. The machine learning process would be trained to generate scores based on previous inputs. It is noted that the ranking algorithm may consider both the context and previous selections simultaneously to generate the score. That is, both the context and previous selections are input into the machine learning process or rules are applied to both. Or, a first score is determined for the context and then separately a score is determined for the previous selections for a candidate.

In one embodiment, the ranking process may rank all the candidates in the list based on distance. For example, ranker 210 may transform each candidate into a high-dimension vector V, such as the ASCII code as each component of V. The ASCII code may be a character code for the components of the date. Then, ranker 210 calculates a distance, such as a cosine distance, between the vector V and the vector of the current input. The distance may be measured based on the similarity between the two non-zero vectors of an inner product space that measures a cosine of the angle between them. After measuring the distance, the context and previous input may cause a first candidate to be ranked higher than a second candidate even if the distance for first candidate is longer (the first candidate is less similar than the second candidate to the input). Then, ranker 210 can select the nearest X records from the candidate list. For example, the nearest five candidates may be selected.

Figure 3:
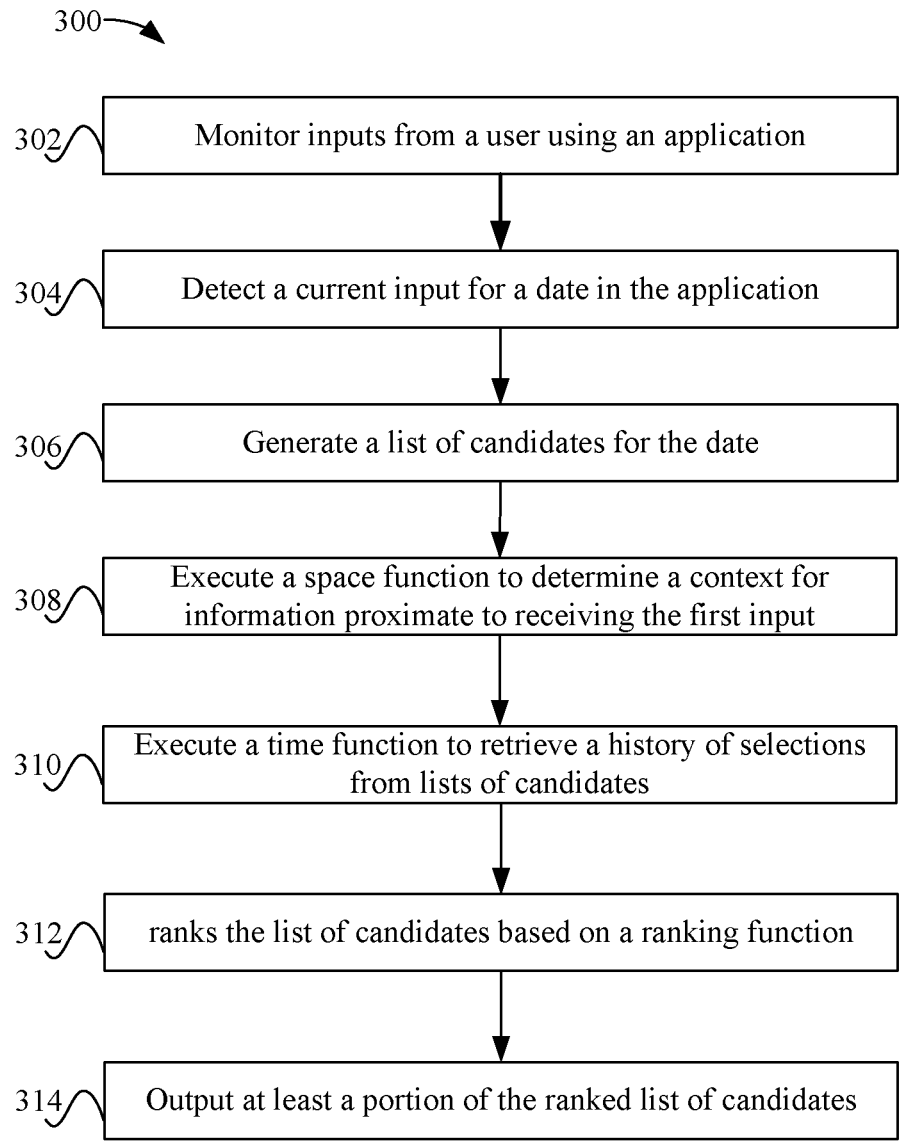
FIG. 3 depicts a simplified flowchart of a method for providing date correction according to one embodiment.

FIG. 3 depicts a simplified flowchart 300 of a method for providing date correction according to one embodiment. At 302, date correction logic 110 monitors inputs from a user using an application. At 304, date correction logic 110 detects a current input for a date in the application. The current input may be detected based on pattern recognition or based on the entry box in which the user entered the current input.

At 306, date correction logic 110 generates a list of candidates for the date. The list of candidates may be different possible formats for the date. The list of candidates may be generated based on rules for possible date formats.

At 308, date correction logic 110 executes a space function to determine a context for information proximate to receiving the first input. For example, the context may be based on inputs received on a same page as the current input.

At 310, date correction logic 110 executes a time function to retrieve a history of selections from lists of candidates. For example, a number of selections by the user within a certain time period are determined.

At 312, date correction logic 110 ranks the list of candidates based on a ranking function. The ranking function may calculate the distance of the list of candidates from the input and also use the context and the selections from the space function and time function to rank the list of candidates. Other factors may also be used to rank the list of candidates. At 314, date correction logic 110 then outputs at least a portion of the ranked list of candidates.

Figure 4:
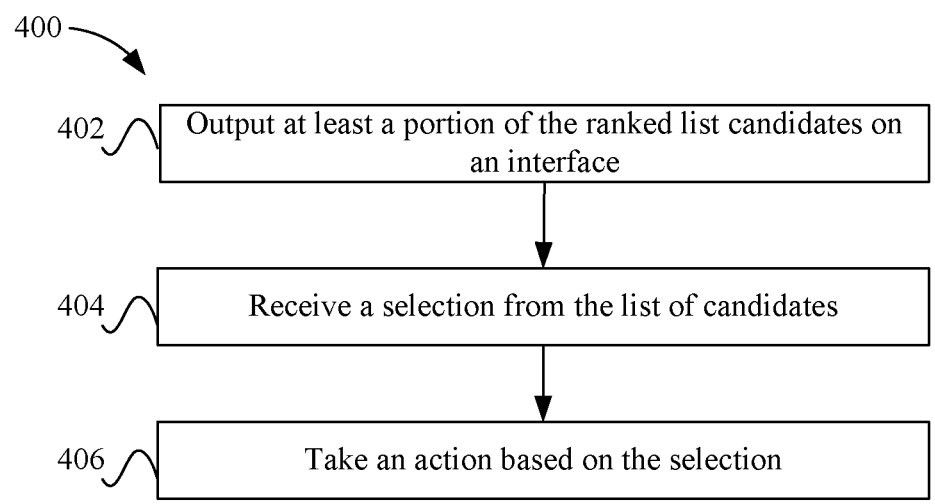
FIG. 4 depicts a simplified flowchart for receiving a date correction selection according to one embodiment.

After outputting the list, a user can then select one of the candidates. By ranking the list of candidates, the process of determining which candidate is appropriate is simplified for a user. For example, the user most likely will select the first candidate and not have to review the other candidates. FIG. 4 depicts a simplified flowchart 400 for receiving a date correction selection according to one embodiment. At 402, date correction logic 110 outputs at least a portion of the ranked list candidates on interface 108. For example, the portion of the ranked list of candidates may be output in a list that is by an entry box in which the current input was received.

At 404, date correction logic 110 receives a selection from the list of candidates. The selection may select one of the candidates where the candidate is in a certain date format.

Once the selection is received, at 406, date correction logic 110 may take an action based on the selection. In one embodiment, date correction logic 110 may take different actions. For example, date correction logic 110 may correct the current input in an interface 108 with the selection. In one example, if the input was "301211", and the selection was "Dec. 30, 2011", then date correction logic 110 changes the input to "Dec. 30, 2011". In another example, date correction logic 110 may send the selection to application 106, which may be executing on server 104. Application 106 may then use the selection to interpret the current input correctly. For example, application 106 may determine that the input is "Dec. 30, 2011". This may remove ambiguity for the current input. In this case, the current input may or may not be changed on interface 108. However, application 106 may correctly know which date the user intended for the current input. This may improve the accuracy of application 106. For example, application 106 may be storing information from an entry box and by knowing the correct date, the information may be stored correctly. For example, application 106 may store the date based on the selected candidate in a table in a database.

The following are some examples of current inputs and the possible candidates that are available. In a first example, the current input may be "2012-01-10". The ambiguity in this example may be the digits "01" and "10", which could be Month-Day or Day-Month. Date correction logic 110 may determine the candidates as "Jan. 10, 2012" and "Oct. 01, 2012". In one embodiment, the component "01" is given a higher probability as being a month, and the candidate "Jan. 10, 2012" is ranked higher in this case. The "Jan. 10, 2012" candidate may be ranked higher due to the prior selections of the user or the context. It is noted that other candidates may also be provided for a user. The candidates use the months spelled out are provided such that date correction logic 110 can determine the correct date without ambiguity. If only numbers are used, then date correction logic 110 would not be able to determine the correct date format without ambiguity. However, date correction logic 110 may provide a candidate that the user can select and then adjust the date to the preferred format for the application. That is, the format MM/DD/YY may be preferred by the application, and once the user selected "Jan. 10, 2012—01/10/12", date correction logic 110 changes the input to "01/10/12".

In a second example, if the input is "Jun. 01, 2012", date correction logic 110 would not provide any candidates because the current input is clear. That is, date correction logic 110 can determine what the date is without any ambiguity. In other examples, date correction logic 110 may provide some candidate options if it is determined that the user has selected other date formats previously or a context for the current input indicates a different date format should be used. For example, the date format of Jun. 1, 2012 may be provided as an option.

In a third example, if the input is "301211", date correction logic 110 then determines the candidates of "Dec. 11, 2030", "Dec. 30, 2011", and "Dec. 11, 1930". These options are provided such that the correct date can be verified from the current input. The candidates may be ranked based on the distance, the context, and the historical selections. For example, if the current date is 2030 and is determined from the context, then that context may be used to rank the date "Dec. 11, 2030" first. Additionally, if the user had selected a date format that had the components of day, month, year, then date correction logic 110 may select the second candidate of "Dec. 30, 2011" as being the highest ranked candidate.

Figure 5:
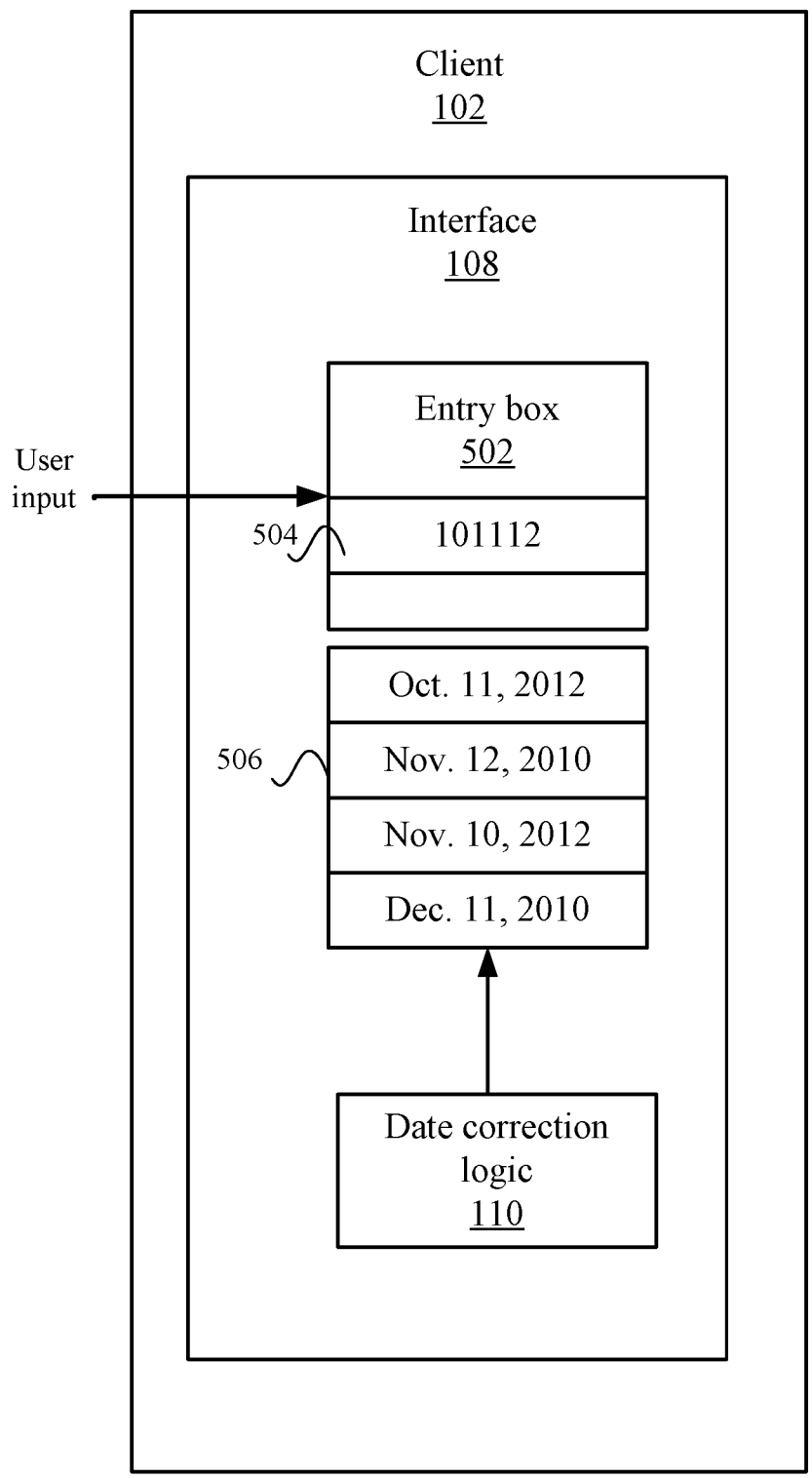
FIG. 5 depicts an example of an interface according to one embodiment.

FIG. 5 depicts an example of interface 108 according to one embodiment. At 502, an entry box for application 105 is shown. At 504, a current input has been received from the user in entry box 502. The input is "101112".

Date correction logic 110 may then determine the possible candidates for the current input. At 506, a ranked list of candidates is displayed in association with entry box 502. For example, the ranked list is shown from 506-1-506-4 of "Oct. 11, 2012", "Nov. 12, 2010", "Nov. 10, 2012", and "Dec. 11, 2010". The user can select one of these options by selecting the candidate using a mouse or using the keypad. Once a selection is received, date correction logic 110 may take an action, such as by changing the current input 504 in entry box 502. In another embodiment, date correction logic 110 may send the selection to application 106 for notation such that it could be used to determine what date the user input.

Accordingly, particular embodiments detect when a date is input and provide candidates that ensure the correct date is understood from the input. By ranking the options using the space function and time function, the ranked list may make it easier for the user to select the date. Further, it may be more likely that the user may select the correct date if the higher-ranked options are more like the correct date.

FIG. 6 illustrates hardware of a special purpose computing machine configured with date correction logic 110 according to one embodiment. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
monitoring, by a computing device, user input by a user using an application;
detecting, by the computing device, a first user input for a date in the application;
generating, by the computing device, a list of candidates for the first user input, the list of candidates listing the date in different formats that are possible based on the date;
using, by the computing device, a space function to retrieve context for the first user input, the context selected from user inputs that have been received within a threshold of the first user input;
using, by the computing device, a time function to retrieve a history of user selections, wherein the history of user selections selected a candidate from one or more prior lists of candidates that listed dates in a different format and were output to the user;
ranking, by the computing device, the list of candidates based on a ranking function that uses the context and the candidates selected in the history of user selections to rank the list of candidates; and
outputting, by the computing device, at least a portion of the ranked list of candidates on the application for a user selection by the user.

2. The method of claim 1, wherein the space function retrieves the context from the information that is on a same page as the first user input in the application.

3. The method of claim 1, wherein the context is a language used by the information proximate to the first user input.

4. The method of claim 1, wherein the context comprises user input other than user input that entered dates.

5. The method of claim 1, wherein the history of user selections includes selections from users other than the user from the one or more lists of candidates.

6. The method of claim 1, wherein the history of user selections indicates one or more date formats that were selected for the prior user inputs.

7. The method of claim 1, wherein ranking comprises:
converting the list of candidates into a list of vectors;
calculating a list of distances between each vector in the list of vectors and a vector of the first user input; and
ranking the list of candidates based on the list of distances.

8. The method of claim 7, wherein ranking comprises:
selecting a top ranked portion of the list of date formats for the at least the portion of the ranked list of candidates.

9. The method of claim 7, wherein ranking comprises:
using the context and the history of selections to alter the ranking of the list of candidates.

10. The method of claim 1, further comprising:
receiving a user selection of one of the at least the portion of the ranked list of candidates; and
replacing the first user input based on the selection.

11. The method of claim 1, further comprising:
receiving a user selection of one of the at least the portion of the ranked list of candidates; and
causing a storing of the first user input based on a format of the selection.

12. The method of claim 11, wherein the first user input is changed based on the format before storing.

13. The method of claim 11, wherein the application uses the selection to verify the format of the first user input.

14. A non-transitory computer-readable storage medium containing instructions, that when executed, control a computer system to be operable for:
monitoring user input by a user using an application;
detecting a first user input for a date in the application;
generating a list of candidates for the first user input, the list of candidates listing the date in different formats that are possible based on the date;
using a space function to retrieve context for the first user input, the context selected from user inputs that have been received within a threshold of the first user input;
using a time function to retrieve a history of user selections, wherein the history of user selections selected a candidate from one or more prior lists of candidates that listed dates in a different format and were output to the user;
ranking the list of candidates based on a ranking function that uses the context and the candidates selected in the history of user selections to rank the list of candidates; and
outputting at least a portion of the ranked list of candidates on the application for a user selection by the user.

15. The non-transitory computer-readable storage medium of claim 14, wherein the space function retrieves the context from the information that is on a same page as the first user input in the application.

16. The non-transitory computer-readable storage medium of claim 14, wherein the context is a language used by the information proximate to the first user input.

17. The non-transitory computer-readable storage medium of claim 14, wherein the context comprises user input other than user input that entered dates.

18. The non-transitory computer-readable storage medium of claim 14, wherein the history of user selections includes selections from users other than the user from the one or more lists of candidates.

19. The non-transitory computer-readable storage medium of claim 14, wherein the history of user selections indicates one or more date formats that were selected for the prior user inputs.

20. An apparatus comprising:
one or more computer processors; and
a non-transitory computer-readable storage medium comprising instructions, that when executed, control the one or more computer processors to be operable for:
monitoring user input by a user using an application;
detecting a first user input for a date in the application;
generating a list of candidates for the first user input, the list of candidates listing the date in different formats that are possible based on the date;
using a space function to retrieve context for the first user input, the context selected from user inputs that have been received within a threshold of the first user input;
using a time function to retrieve a history of user selections, wherein the history of user selections selected a candidate from one or more prior lists of candidates that listed dates in a different format and were output to the user;
ranking the list of candidates based on a ranking function that uses the context and the candidates selected in the history of user selections to rank the list of candidates; and outputting at least a portion of the ranked list of candidates on the application for a user selection by the user.

\* \* \* \* \*